G. L. BENNETT.
ICE VENDING MACHINE.
APPLICATION FILED AUG. 29, 1919.

1,339,053.

Patented May 4, 1920.
3 SHEETS—SHEET 1.

George L. Bennett INVENTOR

Frank P. Wentworth
his ATTORNEY.

G. L. BENNETT.
ICE VENDING MACHINE.
APPLICATION FILED AUG. 29, 1919.
1,339,053.
Patented May 4, 1920.
3 SHEETS—SHEET 2.
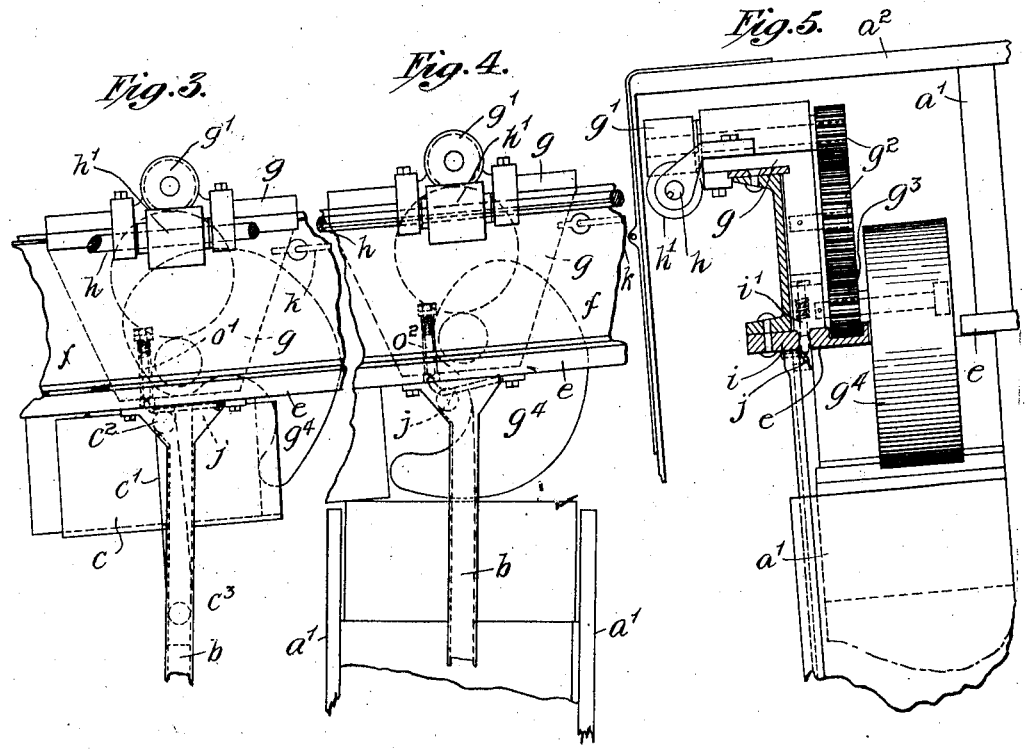
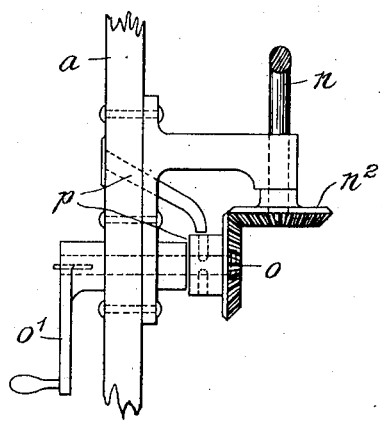
George L. Bennett INVENTOR
Frank P. Wentworth
his ATTORNEY.

G. L. BENNETT.
ICE VENDING MACHINE.
APPLICATION FILED AUG. 29, 1919.
1,339,053.
Patented May 4, 1920.
3 SHEETS—SHEET 3.
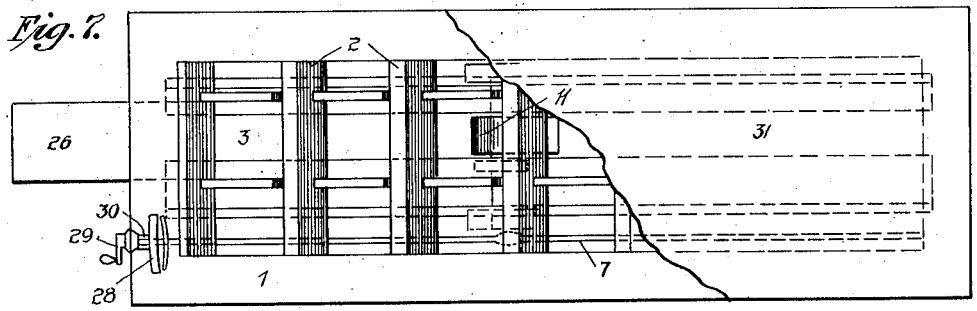
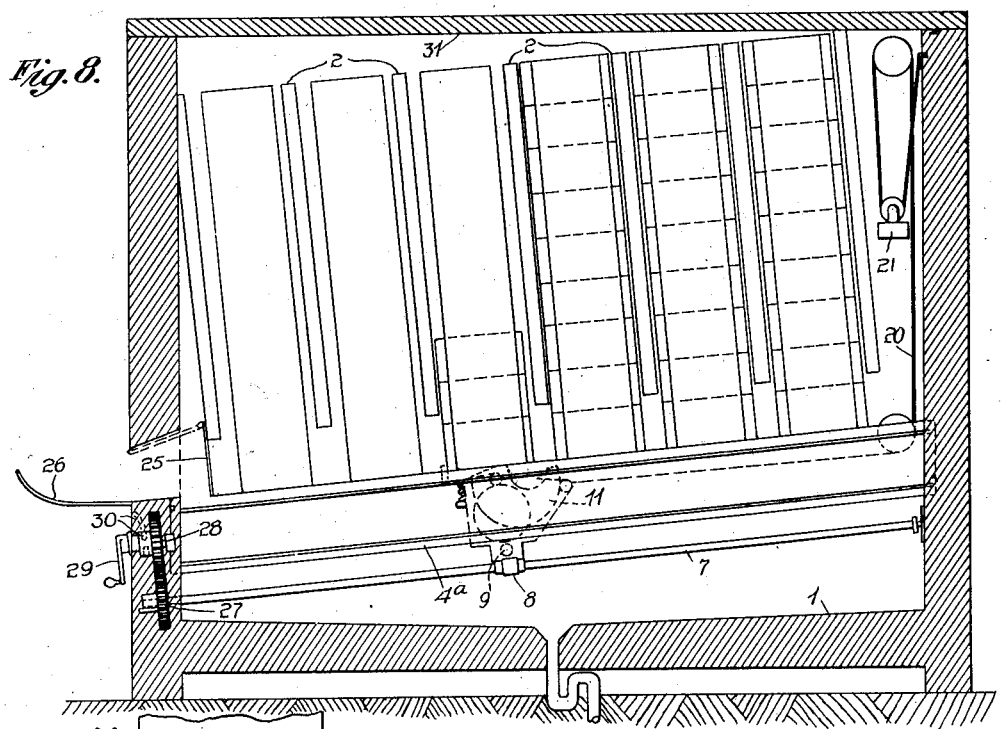
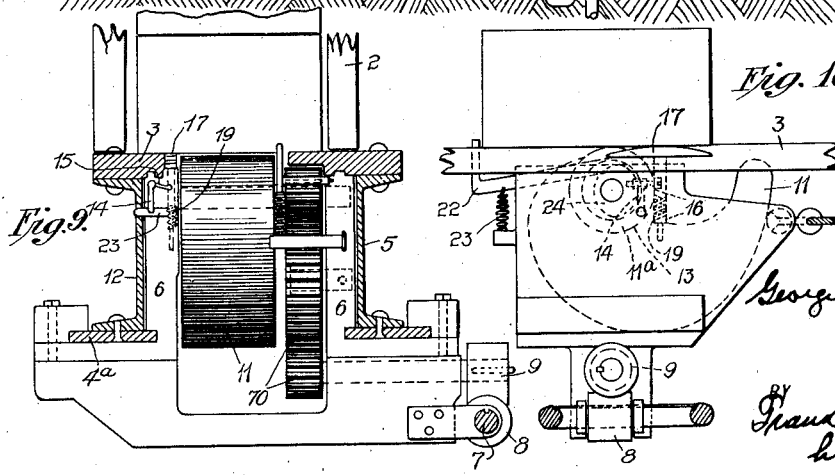
INVENTOR
George L. Bennett
BY
ATTORNEY.

UNITED STATES PATENT OFFICE.

GEORGE L. BENNETT, OF HASTINGS-UPON-HUDSON, NEW YORK.

ICE-VENDING MACHINE.

1,339,053.          Specification of Letters Patent.          Patented May 4, 1920.

Application filed August 29, 1919. Serial No. 320,664.

*To all whom it may concern:*

Be it known that I, GEORGE L. BENNETT, a citizen of the United States, residing at Hastings-upon-Hudson, in the county of Westchester and State of New York, have invented certain new and useful Improvements in Ice-Vending Machines, of which the following is a specification, reference being had therein to the accompanying drawings, which form a part thereof.

My invention relates to ice vending machines, and more particularly to a machine of this type, the actuating mechanism of which may be manually operated to deliver one cake of ice at a time to a person depositing a coin or check in the machine. The essential characteristic of the invention is the mechanism for storing and delivering the ice, since any desired form of check control mechanism, adapted for the purpose, may be used.

A machine made in accordance with my invention has a plurality of alined compartments each adapted to receive a stack of ice, each line of compartments having associated therewith a delivery mechanism which will successively feed cakes of ice from one compartment, and with the delivery of the last cake therein, automatically shift to the next compartment, which operation will be repeated until all the cakes of ice in every compartment will have been delivered.

The delivery mechanism is so constructed as to not only avoid breakage of the ice, but to relieve the cake being delivered from stresses applied through the adjoining cake in the stack, and thus afford the necessary clearance to permit the cake being delivered, to slide freely toward and into the delivery chute.

To insure the delivery of all cakes in a compartment before the delivery mechanism moves to the next compartment, I provide retaining means operative upon the sliding carriage of the delivery mechanism, which retaining means is released only after the delivery of the last cake of ice in a compartment, this mechanism acting automatically to stop the carriage when it has reached the necessary operative relation to the succeeding compartment.

A vending machine made in accordance with my invention may be so constructed that the cakes of ice in each compartment will have an up feed, or a down feed, so that the machine may be adapted for use above or below street level, as desired.

The delivery chute is protected by a door with the two-fold object of excluding air from the device and thus avoid melting of the ice, and also of preventing the insertion of hooks or other implements within the apparatus for the purpose of withdrawing ice therefrom by means other than the delivery mechanism above referred to.

The various compartments are formed by transverse partitions having the two-fold function of preventing ice in one compartment from sliding into the adjacent compartment as it is emptied, and of permitting the delivery of ice across the open end of the various empty compartments, when necessary.

When using an up feed, the ice in each compartment is supported by a pan which is acted upon by counterweights so constructed as to be successively arrested to insure uniform pressure on the uppermost cake of the stack of ice, as cakes of ice are successively removed from the stack, while insuring a gradual increase of the counterweight operative upon the pan, as the machine is being recharged with ice after being emptied.

With the down feed machine, this mechanism, however, is unnecessary.

The machine is provided with a removable top and is of a height to be readily charged from a wagon, the purpose of the invention being to provide automatically acting stations which may be charged at long intervals, but will not require the services of an attendant at other times.

Each unit will embrace the characteristics above referred to, so that an increase in the size of a station will merely involve a multiplication of the number of units, each one of which will operate entirely independently of the others. The capacity of a station is determined by the number of such units.

The invention consists primarily in an ice vending machine embodying therein a housing having transverse partitions therein forming a plurality of alined storage compartments each adapted to receive a stack of cakes of ice, space being afforded at one end of said partitions for the passage of one cake of ice at a time, a delivery chute, means whereby a cake of ice being delivered may pass from any of said compartments to said delivery chute, a traveling delivery mechanism, means whereby said mechanism will be successively brought into the operative relation to each of said compartments, actuating means for said delivery mechanism, and a check control mechanism for preventing the unauthorized actuation of said delivery mechanism; and in such other novel features of construction and combination of parts, as are hereinafter set forth and described, and more particularly pointed out in the claims hereto appended.

Referring to the drawings,

Fig. 3 is a detail view of the delivery mechanism showing the relation of parts upon the delivery of the last cake of ice of a stack;

Fig. 4 is a similar view showing the relation of parts upon the delivery of any other cakes of ice in a stack;

Fig. 5 is a projection of the mechanism shown in Fig. 4;

Fig. 6 is a detail view of the actuating means, showing a conventional check control mechanism in relation thereto;

Fig. 7 is a plan view with a portion of the cover broken away, of a single unit down feed machine;

Fig. 8 is a longitudinal section thereof, and

Figs. 9 and 10 are respectively, a front and side view of the delivery mechanism employed in the form of the invention shown in Figs. 7 and 8.

Like letters refer to like parts throughout the several views.

Figure 1:
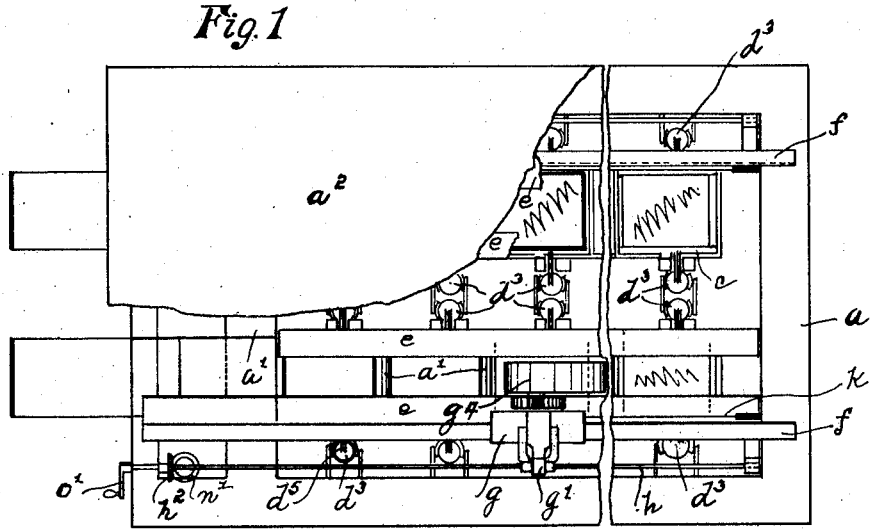
Figure 1 is a plan view, with a portion of the cover broken away, of a two unit machine of the up feed type, made in accordance with my invention.
Figure 2:
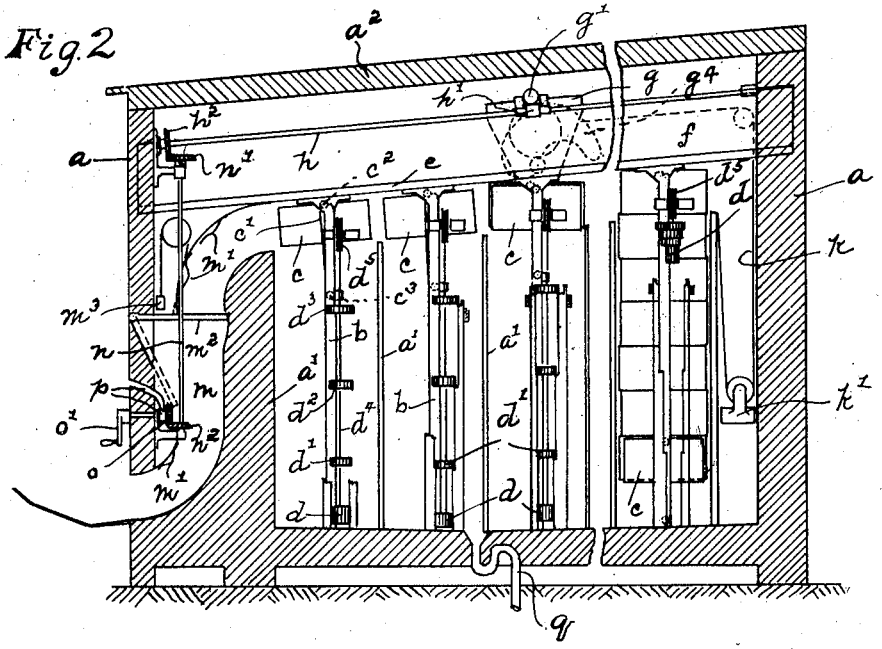
Fig. 2 is a longitudinal section thereof upon the line 2—2 of Fig. 1.

In the embodiment of my invention shown in Figs. 1 to 6 of the drawings, I have illustrated an up feed machine embodying therein a housing $a$, the walls of which are so constructed as to have the desired insulating properties to avoid undue melting of the ice contained therein. This housing is provided with any desired number of transverse partitions $a'$ forming a sequence of substantially vertical chambers each adapted to receive a stack formed of cakes of ice.

Upon opposite sides of each of the chambers so formed are vertically extending guides $b$ between which is mounted a vertically movable pan $c$ upon which the lowermost cake of ice rests, and the vertical movement of which will raise the stack of ice contained in a compartment so as to bring said cakes successively into a position where they may be acted upon by the delivery mechanism to be more fully referred to hereinafter.

Acting upon each pan $c$ is a counterweight structure comprising a plurality of weights $d$, $d'$, $d^2$ and $d^3$ carried by the flexible member $d^4$ passing over pulleys $d^5$ adjacent the top of the machine, said weights respectively being adapted, with the ascent of the pan $c$, to engage stops upon the guides $b$ and thus proportion the aggregate weight of the counterweight structure to the load upon said pan.

The guides $b$ and the pan $c$ associated therewith are provided with coöperating means whereby when the pan reaches the uppermost position upon the guides, and as the last cake of ice in the stack is being forced therefrom, it will be automatically tilted so as to facilitate the delivery of the last cake of ice in the stack and serve as a part of a runway over which cakes of ice from the adjoining stack may pass to the delivery chute. This automatic tilting mechanism comprises side bars $c'$ rigidly attached to the pan $c$ and having adjacent opposite ends thereof rollers $c^2$—$c^3$ having movement in the channel of the guide $b$. The upper end of each guide is formed at an angle toward the delivery chute and notched as shown, so that the upper roller $c^2$ will be held against forward movement as the ice cake reaches the uppermost position, but as the cake of ice slides therefrom and the pan is given slight further upward movement it will tilt toward the delivery end of the mechanism, the lower roller $c^3$ remaining in the vertical channel of said guides. The inclined rails $e$ are engaged by the uppermost cake of ice in each stack, and thus secure this operative effect.

Above the top of the various partitions $a'$ is a track $f$, upon which the delivery carriage $g$ is slidably mounted so as to be capable of being brought successively and automatically into the operative relation to succeeding compartments containing stacks of ice, said carriage and the mechanism carried thereby being maintained in the operative relation to each of said compartments until all of the cakes of ice therein have been delivered.

Mounted in the housing $a$ is a shaft $h$ extending for the entire depth of said housing, or for a length corresponding with that of the track $f$, this shaft having splined thereto a skew gear $h'$ coöperating with the skew gear $g'$ carried by the carriage $g$. Mounted upon the same shaft as the skew gear $g'$ is the first wheel of a gear train $g^2$, the last gear $g^3$ of which is mounted upon the shaft of the hooked cam $g^4$, the riser of which is adapted to engage the uppermost cake of ice of the stack in which the discharge mechanism is in the operative relation, and the fall of which is adapted to engage the cake of ice immediately below, and thus relieve the cake of ice being delivered from stresses from the counterweights, and insure a gradual feeding movement of the stack.

The inclined top rails $e$ serve as stops to limit the upward movement of the cakes of ice in a stack, while permitting a free movement thereof during the delivery operation.

The carriage $g$ is retained in the operative relation to each compartment until all of the cakes of ice therein have been delivered by means of a longitudnally extending plate $i$ having a bolt opening therein adjacent each such chamber, which opening is adapted to receive a spring pressed bolt $i'$ carried by the carriage $g$. Mounted upon the underside of the plate $i$, adjacent each of the bolt openings therein, is a pivotal plunger member $j$, one end of which is arranged in the path of movement of the roller $c^2$, so that when said roller reaches the uppermost position and moves toward the delivery chute so as to tilt the pan $c$, it will move said plunger member, and through it act upon the bolt $i'$ in a manner to retract it from the socket, and thus permit movement of the carriage $g$ toward the adjacent chamber arriving at which the bolt $i'$ will enter the bolt socket adjacent said chamber and thus stop the carriage.

Acting upon the carriage $g$ through the flexible member $k$ is a weight $k'$ which will normally have a tendency to impart travel to the carriage $g$. The shaft $h'$, track $f$ and plate $i$ are arranged at an incline, as shown, to facilitate the formation of an inclined runway by means of succeeding pans $c$ and thus facilitate the delivery of the ice to the delivery chute. The succeeding guides $b$ will also be of graduated heights to secure this same condition.

The plate $i$ is supported by the various guides $b$ upon one side of each compartment, the track $f$ being supported by the channel bar $f'$ from said plate $i$. This, however, is a mere matter of design.

Toward the front of the housing $a$, I arrange a chute $m$ one end of which terminates adjacent the top of the chamber nearest the front of the machine, and the other end of which opens outwardly of the machine, so that the purchaser may receive the cake of ice delivered at the front of the machine. Arranged in this chute are one or more retard springs $m'$ acting upon the surface of the cake of ice to prevent the development of too great momentum, and thus minimize likelihood of the chipping of the ice while in the delivery chute.

Pivotally mounted on the front wall of the housing $a$ is a gate $m^2$ acted upon by a counterweight $m^3$ so as to normally close the chute $m$ to atmosphere. The walls of the chute $m$ are broken away to permit the projection of the gate $m^2$ across the chute.

Mounted upon the interior wall at the front of the housing $a$, is a vertically extending shaft $n$ having beveled gears $n'$—$n^2$ at the opposite ends thereof, the first of which gears meshes with a gear $h^2$ carried by the shaft $h$, and the latter of which meshes with a gear $o$ adapted to be coupled to the actuating crank $o'$ through a coin control mechanism $p$, which is shown merely conventionally in the drawings, since the detailed construction thereof forms no part of my present invention.

The housing $a$ is provided with a cover $a^2$ hinged or otherwise movably mounted thereon so as to facilitate the charging and recharging of the various compartments through the top of the housing $a$.

Leading from the bottom of the housing $a$ is a drain pipe $q$ for conveying water from within said housing, the bottom of the housing being suitably formed to insure a complete drainage thereof.

Referring to the form of the invention shown in Figs. 7 to 10, the construction is as heretofore described, excepting as to those modifications required to have the cakes of the stacks of ice in the different chambers feed downwardly as each chamber is being emptied, instead of upwardly, as in the form of the invention shown in Figs. 1 to 6. In this form of the invention the housing is shown at 1, the transverse partitions at 2, these partitions having a space at the bottom thereof sufficient to permit the passage of no more than one cake of ice at a time, and being arranged at an angle as shown, so that the different stacks of ice will extend perpendicularly to the runway 3 adjacent the bottom of the housing. Below the runway 3 are tracks 4—$4^a$ supported by the beams 5 and 12, the carriage 6 of the delivery mechanism being slidably mounted upon said tracks 4—$4^a$.

Mounted below the tracks 4—$4^a$ is a shaft 7 having splined thereon the skew gear 8 in mesh with the skew gear 9 through which power is transmitted through the gear train 10 to the cam 11, similar in form and mode of operation to the cam $g^5$ with the exception that instead of counter-acting the effect of the counterweights $d$, said cam actually sustains the load of the cakes of ice of the stack within the chamber at which the carriage 6 is at the moment operative.

The beam 12 has a sequence of bolt sockets therein, one adjacent each ice chamber.

The portion of the carriage 6 in this form of the invention adjacent the beam 12, has slidably mounted therein a bolt 13 adapted to enter the various sockets in the beam 12 and be actuated by a bell crank lever, the two arms 14 and 15 of which are connected by a torsion spring 16 so as to permit the movement of the arm 15 independently of that of the arm 14, and permit the actuating means for said bell crank lever to be depressed before the bolt 13 is in register with its socket opening, the cam 11 having a riser 11$^a$ on the side thereof adapted to prevent movement of said bolt while said cam is being actuated.

Normally projecting through a longitudinal slot in, and above the bottom 3 of the housing, is a beveled shoe 17 adapted to be depressed by engagement with ice in any of said compartments, said shoe having a stem 18 slidably mounted in the carriage 6 and being acted upon by a spring 19 to normally project it within the compartment. The stem 18 is operatively connected with the arm 15 of the bell crank lever so that with the engagement of a cake of ice with the shoe 17, said shoe will be depressed, thus oscillating the arm 15 and tensioning the spring 16 so that when the bolt 13 registers with the next bolt socket, in the beam 12, it will instantly enter same and thus arrest further movement of the carriage 6.

Acting upon the carriage 6 through the flexible member 20, is a weight 21 which has a normal tendency to impart travel to the carriage 6.

The bottom 3 being upon an incline, there will not only be a normal tendency of the bottom cake of ice to slide toward the delivery chute, but a person might insert a hook through the delivery chute and thus extract cakes of ice without paying for same.

To meet this condition, I provide the carriage 6 with an angular, pivotal lever catch 22, the upturned end of which projects slightly across the space below any partition, being normally thrust upwardly by the spring 23. The other end of said catch is acted upon by a cam 24 carried by the shaft of the cam 11 having an abrupt rise thereon, so that with the initial movement of the cam 11, the catch 22 will be retracted and leave a clear field for the ice to move along the inclined bottom 3 to the delivery chute.

Upon the partition 2 nearest the front of the machine, is pivoted a gravity gate 25 projecting across and closing the discharge opening at the front of the housing 1, so as to exclude air from the various chambers and minimize wastage through the melting of the ice.

The ice cakes as they pass from the housing 1 are received upon a retaining chute 26. The shaft 7 carries a gear 27 in mesh with a gear 28 adapted to be coupled to an actuating crank 29 through a coin controlled mechanism shown conventionally at 30.

The movable top of the housing 1 is shown at 31.

The operation of the herein described vending machine is substantially as follows:—

Referring more particularly to the form of the invention shown in Figs. 1 to 6, the various compartments or chambers are filled through the open top of the housing $a$, the weight $k$ first being raised to permit the carriage $g$ to move by gravity to adjacent the compartment nearest the front of the machine, this being done, however, only after said compartment has been filled with ice. As the carriage passes each emptied compartment, the plunger member $j$ will prevent the bolt $i''$ from entering the socket of the plate $i$ adjacent that compartment, the plunger member $j$ adjacent the front compartment when filled with ice, being clear of the bolt socket so as to permit the bolt to enter this socket. As each compartment is being filled, the pan $c$ therein will descend, which movement will be relieved by the counterweight structure described.

When a purchaser desires a cake of ice, a coin or check is inserted in the slot of the check control mechanism $p$, thus coupling the actuating crank $o'$ to the gear $o$ and permitting power to be transmitted through said crank and the shaft $n$ to the shaft $h$ carrying the skew gear $h'$. The rotation of said shaft $h$ will, through the gear $g'$ and the gear train $g^2$, impart rotary movement to the hooked cam $g^4$, the end of the rise of which will engage the uppermost cake of ice in the stack occupying the compartment adjacent which the carriage $g$ may be, and thrust it toward the chute $m$ through which it will descend to the outside of the machine, where the purchaser may secure possession of it.

When once started by the cam $g^4$, the cake of ice will slide freely from the machine, the rails $e$ serving as a guide in addition to acting as a stop limiting the upward movement of the stack.

As the uppermost cake is removed, the counterweight structure described will raise the pan $c$ and the remaining cakes in the stack, the upward thrust of the cake immediately below that being delivered being directed against the fall of the cam so that the counterweights cannot exert such a thrust upon the cake being delivered, as to retard the movement thereof. Upon the completion of the rotation of the cam $g^4$ the uppermost cake of ice will have been discharged from its compartment, and the cake immediately below will occupy a position above the top of the partition $a'$.

As the last cake of ice in a stack is delivered, the roller $c^2$ will enter the notch in the inclined portion of the way in the guides $b$, but as the cake of ice leaves the pan, its movement along the rails $e$ will depress said pan and tilt said bar $c'$ about the roller $c^3$ thus permitting a slight further upward movement of the pan and give it a permanent set in a position with the bottom thereof parallel with the rails $e$.

At the same time the roller $c^2$ will engage the plunger member $j$ and thus force the bolt $i'$ from its socket and permit the carriage $g$ to be moved by the weight $k'$ until the bolt $i'$ comes into register with the next socket of the plate $i$, whereupon the movement of the carriage will be arrested with the cam $g^4$ in the operative position with relation to the cakes of ice in the adjoining compartment or chamber.

This operation is repeated in connection with each compartment until all of the compartments have been completely emptied.

As each cake of ice descends in the chute $m$, the springs $m'$ will retard the fall thereof and prevent the development of too great momentum, and upon the engagement of each cake with the door or gate $m^2$, it will pivot under the weight of the ice and thus afford clearance for the passage thereof to the delivery point, the counterweight $m^3$ immediately thereafter restoring said door or gate to its normal position, closing the chute when the cake has passed same.

Referring now to the form of the invention shown in Figs. 7 to 10, the manner of charging the housing is the same as heretofore described in connection with the structure shown in Figs. 1 to 6.

When all of the compartments are filled, the lowermost cake in each stack will be positively held against movement by the catch 22 and thus prevent an unauthorized withdrawal of any of the ice, or the accidental delivery of more than one cake at a time.

In this form of the invention, when the shaft 7 is rotated, rotary movement will be imparted to the cam 11, the initial movement of this cam releasing this catch 22, and imparting a starting impulse to the lowermost cake of ice. With the continued rotation of the cam, the rise thereof will engage the bottom of the cake of ice immediately above that being delivered, and as the cake being delivered leaves the compartment below the partition 2, the entire stack in the compartment will gradually descend under the control of said cam to bring the cake in the stack above that being delivered, to the position where the cam may act thereon. Immediately that a cake of ice is delivered, the catch 22 will automatically assume its normal operative position, thus preventing the second cake of ice from following the first cake.

While the cam 11 is being rotated, the riser 11ª thereon will be in the path of movement of the bolt 13 and will prevent its being withdrawn from its socket until the cam has reached normal, so that while the shoe 17 may freely rise within a compartment, as each cake of ice is discharged, it can not retract the bolt 13 and thereby permit the weight 20 to move the carriage 6 to the next compartment, until the cam 11 returns to normal after discharging the last cake of ice from a stack.

Since the shoe 17 will engage the lowermost cake of ice in the next compartment before the bolt 13 is in register with the socket adjacent said compartment, I provide a lost motion connection between the arms 14 and 15 so that the bolt will be shot under the influence of the spring 16, after the shoe 17 has been depressed by contacting with the lowermost cake of ice in such compartment.

As the cake of ice descends upon the inclined bottom 3 toward the delivery, it will engage the gravity gate 25 which will swing outwardly under the load of the cake of ice and will immediately return to normal when the cake of ice has completely passed same.

It will be observed that in both forms of the invention, the construction and mode of operation of the delivery mechanism is substantially the same, there being a substantial reversal of parts in the two forms.

In a machine made in accordance with my invention, any desired number of alined compartments may be used in a unit, and any desired number of units may be employed in a station.

By having the machine of a height so that it may be readily charged from a wagon, economy in charging is secured.

Any desired form of cover may be used, it being desirable, however, to provide locking means to prevent access to the interior of the machine.

By the construction described, ice may be quickly delivered, each cake being of a predetermined weight, a considerable loss from shrinkage being provided for, to insure a continued run of the machine. No attendant is required, as each purchaser upon depositing a coin in the slot will be enabled to actuate the machine to deliver the ice.

In a machine made in accordance with my invention, I not only secure economy in the handling of the ice, but am enabled to deliver same rapidly with a minimum of waste to the distributer as well as to the consumer, and at the same time protect the consumer as to the weight of ice he receives for a fixed consideration.

It is not my intention to limit the invention to the precise details of construction shown in the accompanying drawings, it being apparent that such may be varied without departing from the spirit and scope of the invention.

Having described the invention, what I claim as new and desire to have protected by Letters Patent, is:—

1. An ice vending machine embodying therein a housing having transverse partitions therein forming a plurality of alined storage compartments each adapted to receive a stack of cakes of ice, space being afforded at one end of each of said partitions for the passage of one cake of ice at a time, a delivery chute, means whereby a cake of ice being delivered may pass from any of said compartments to said delivery chute, a traveling delivery mechanism, means whereby said mechanism will be successively brought into the operative relation to each of said compartments, actuating means for said delivery mechanism, and a check control mechanism for preventing the unauthorized actuation of said delivery mechanism.

2. An ice vending machine embodying therein a housing having transverse partitions therein forming a plurality of alined storage compartments each adapted to receive a stack of cakes of ice, space being afforded at one end of each of said partitions for the passage of one cake of ice at a time, a delivery chute, means whereby a cake of ice being delivered may pass from any of said compartments to said delivery chute, a track extending across the various compartments, a carriage slidably mounted thereon, means tending to normally impart movement to said carriage from adjacent one compartment to adjacent the adjoining compartment, a rotatable shaft extending substantially parallel with said track, a gear slidably mounted upon and rotatable with said shaft, a movable member adapted to engage and thrust a cake of ice from a compartment toward said delivery chute, means transmitting power from said shaft and said gear to said movable member, holding means adapted to maintain said carriage adjacent each compartment, means whereby with the delivery of the last cake of ice, said holding means will be automatically released, actuating means for said shaft exposed exteriorly of said housing, and a check control mechanism for preventing the unauthorized actuation of said delivery mechanism.

3. An ice vending machine embodying therein a housing having transverse partitions therein forming a plurality of alined storage compartments each adapted to receive a stack of cakes of ice, space being afforded at one end of each of said partitions for the passage of one cake of ice at at time, a delivery chute, means whereby a cake of ice being delivered may pass from any of said compartments to said delivery chute, a track extending across the various compartments, a carriage slidably mounted thereon, means tending to normally impart movement to said carriage from adjacent one compartment to adjacent the adjoining compartment, a rotatable shaft extending substantially parallel with said track, a gear slidably mounted upon and rotatable with said shaft, a hooked cam, the end of the rise of which is adapted to engage and thrust a cake of ice from a compartment toward said delivery chute, and the fall of which is adapted to engage the adjoining cake of ice in the stack to restrain movement of said stack while the cake of ice is being delivered, and permit gradual advance of remaining cakes in stack after such delivery, means transmitting power from said shaft and said gear to said cam, holding means adapted to maintain said carriage adjacent each compartment, means whereby with the delivery of the last cake of ice, said holding means will be automatically released, actuating means for said shaft exposed exteriorly of said housing, and a check control mechanism for preventing the unauthorized actuation of said delivery mechanism.

4. An ice vending machine embodying therein a housing having transverse partitions therein forming a plurality of alined storage compartments each adapted to receive a stack of cakes of ice, space being afforded above each of said partitions for the passage of one cake of ice at a time, a delivery chute, a counterweighted pan mounted in each of said compartments and tending to normally raise the stack of ice therein, means limiting the upward movement of the stack of ice in each compartment, means controlling the upward movement of said pans respectively, whereby when the last cake of ice is removed, said pan will form a runway for the cakes of ice in the other compartments, a traveling delivery mechanism mounted above said compartments, means whereby said mechanism will be successively brought into the operative relation to each of said compartments, actuating means for said delivery mechanism, and a check control mechanism for preventing the unauthorized actuation of said delivery mechanism.

5. An ice vending machine embodying therein a housing having transverse partitions therein forming a plurality of alined storage compartments each adapted to receive a stack of cakes of ice, space being afforded above each of said partitions for the passage of one cake of ice at a time, a delivery chute, a counterweighted pan mounted in each of said compartments and tending to normally raise the stack of ice therein, means limiting the upward movement of the stack of ice in each compartment, means controlling the upward movement of said pans respectively, whereby when the last cake of ice is removed, said pan will form a runway for the cakes of ice in the other compartments, a track extending across the various compartments, a carriage slidably mounted thereon, means tending to normally impart movement to said carriage from adjacent one compartment to adjacent the adjoining compartment, a rotatable shaft extending substantially parallel with said track, a gear slidably mounted upon and rotatable with said shaft, a movable member adapted to engage and thrust a cake of ice from a compartment toward said delivery chute, means transmitting power from said shaft and said gear to said movable member, holding means adapted to maintain said carriage adjacent each compartment, means whereby with the delivery of the last cake of ice, said holding means will be automatically released, actuating means for said shaft exposed exteriorly of said housing, and a check control mechanism for preventing the unauthorized actuation of said delivery mechanism.

6. An ice vending machine embodying therein a housing having transverse partitions therein forming a plurality of alined storage compartments each adapted to receive a stack of cakes of ice, space being afforded above each of said partitions for the passage of one cake of ice at a time, a delivery chute, a counterweighted pan mounted in each of said compartments and tending to normally raise the stack of ice therein, means limiting the upward movement of the stack of ice in each compartment, means controlling the upward movement of said pans respectively, whereby when the last cake of ice is removed, said pan will form a runway for the cakes of ice in the other compartments, a track extending across the various compartments, a carriage slidably mounted thereon, means tending to normally impart movement to said carriage from adjacent one compartment to adjacent the adjoining compartment, a rotatable shaft extending substantially parallel with said track, a gear slidably mounted upon and rotatable with said shaft, a hooked cam, the end of the rise of which is adapted to engage and thrust a cake of ice from a compartment toward said delivery chute, and the fall of which is adapted to engage the adjoining cake of ice in the stack to restrain movement of said stack while the cake of ice is being delivered, and permit gradual advance of remaining cakes in stack after such delivery, means transmitting power from said shaft and said gear to said cam, holding means adapted to maintain said carriage adjacent each compartment, means whereby with the delivery of the last cake of ice, said holding means will be automatically released, actuating means for said shaft exposed exteriorly of said housing, and a check control mechanism for preventing the unauthorized actuation of said delivery mechanism.

7. An ice vending machine embodying therein a housing having transverse partitions therein forming a plurality of alined storage compartments each adapted to receive a stack of cakes of ice, space being afforded above each of said partitions for the passage of one cake of ice at a time, a delivery chute, a counterweighted pan mounted in each of said compartments and tending to normally raise the stack of ice therein, means limiting the upward movement of the stack of ice in each compartment, channeled guides upon opposite sides of each compartment, the upper ends of the channels of which are inclined toward the delivery chute, bars carried by each pan, having spaced rollers thereon adapted to enter said channeled guides, whereby when the last cake of ice is removed, said pan will be brought to rest and tilted to form an inclined runway for the cakes of ice in the other compartments, a traveling delivery mechanism mounted above said compartments, means whereby said mechanism will be successively brought into the operative relation to each of said compartments, actuating means for said delivery mechanism, and a check control mechanism for preventing the unauthorized actuation of said delivery mechanism.

8. An ice vending machine embodying therein a housing having transverse partitions therein forming a plurality of alined storage compartments each adapted to receive a stack of cakes of ice, space being afforded above each of said partitions for the passage of one cake of ice at a time, a delivery chute, a counterweighted pan mounted in each of said compartments and tending to normally raise the stack of ice therein, means limiting the upward movement of the stack of ice in each compartment, channeled guides upon opposite sides of each compartment, the upper ends of the channels of which are inclined toward the delivery chute, bars carried by each pan, having spaced rollers thereon adapted to enter said channeled guides, whereby when the last cake of ice is removed, said pan will be brought to rest and tilted to form an inclined runway for the cakes of ice in the other compartments, a track extending across the various compartments, a carriage slidably mounted thereon, means tending to normally impart movement to said carriage from adjacent one compartment to adjacent the adjoining compartment, a rotatable shaft extending substantially parallel with said track, a gear slidably mounted upon and rotatable with said shaft, a hooked cam, the end of the rise of which is adapted to engage and thrust a cake of ice from a compartment toward said delivery chute, and the fall of which is adapted to engage the adjoining cake of ice in the stack to restrain movement of said stack while the cake of ice is being delivered, and permit gradual advance of remaining cakes in stack after such delivery, means transmitting power from said shaft and said gear to said cam, holding means adapted to maintain said carriage adjacent each compartment, means whereby with the delivery of the last cake of ice, said holding means will be automatically released, actuating means for said shaft exposed exteriorly of said housing, and a check control mechanism for preventing the unauthorized actuation of said delivery mechanism.

9. An ice vending machine embodying therein a housing having transverse partitions therein forming a plurality of alined storage compartments each adapted to receive a stack of cakes of ice, space being afforded above each of said partitions for the passage of one cake of ice at a time, a delivery chute, a counterweighted pan mounted in each of said compartments and tending to normally raise the stack of ice therein, means limiting the upward movement of the stack of ice in each compartment, means controlling the upward movement of said pans respectively, whereby when the last cake of ice is removed, said pan will form a runway for the cakes of ice in the other compartments, a track extending across the various compartments, a carriage slidably mounted thereon, means tending to normally impart movement to said carriage from adjacent one compartment to adjacent the adjoining compartment, a rotatable shaft extending substantially parallel with said track, a gear slidably mounted upon and rotatable with said shaft, a movable member adapted to engage and thrust a cake of ice from a compartment toward said delivery chute, means transmitting power from said shaft and said gear to said movable member, a plate having a bolt socket therein adjacent each compartment, a bolt carried by said carriage and adapted to automatically enter said bolt sockets and maintain said carriage adjacent said compartments successively, a spring pressed plunger adjacent but adapted to enter its associate socket, said plunger being normally held out of said socket, means carried by each of said pans and adapted to engage a plunger, whereby with the delivery of the last cake of ice from a compartment, said bolt will be automatically retracted to permit movement of said carriage, actuating means for said shaft exposed exteriorly of said housing, and a check control mechanism for preventing the unauthorized actuation of said delivery mechanism.

10. An ice vending machine embodying therein a housing having transverse partitions therein forming a plurality of alined storage compartments each adapted to receive a stack of cakes of ice, space being afforded at one end of said partitions for the passage of one cake of ice at a time, a delivery chute, means whereby a cake of ice being delivered may pass from any of said compartments to said delivery chute, an automatically closing door pivoted adjacent and adapted to extend across said delivery chute and to be actuated by the cake of ice being delivered, whereby said chute will be closed to atmosphere except when a cake of ice is being delivered, a traveling delivery mechanism, means whereby said mechanism will be successively brought into the operative relation to each of said compartments, actuating means for said delivery mechanism, and a check control mechanism for preventing the unauthorized actuation of said delivery mechanism.

11. An ice vending machine embodying therein a housing having transverse partitions therein forming a plurality of alined storage compartments each adapted to receive a stack of cakes of ice, space being afforded at one end of each of said partitions for the passage of one cake of ice at a time, a delivery chute, having one or more springs therein adapted to engage and retard movement of the cake of ice therethrough, means whereby a cake of ice being delivered may pass from any of said compartments to said delivery chute, an automatically closing door pivoted adjacent and adapted to extend across said delivery chute and to be actuated by the cake of ice being delivered, whereby said chute will be closed to atmosphere except when a cake of ice is being delivered, a traveling delivery mechanism, means whereby said mechanism will be successively brought into the operative relation to each of said compartments, actuating means for said delivery mechanism, and a check control mechanism for preventing the unauthorized actuation of said delivery mechanism.

In witness whereof I have hereunto affixed my signature, in the presence of two subscribing witnesses, this 28th day of August, 1919.

GEORGE L. BENNETT.

Witnesses:
FRIEDA KOEHLER,
E. BRADFORD.